W. A. DOBLE.
POWER PROPELLED VEHICLE.
APPLICATION FILED OCT. 1, 1917.
1,354,898.
Patented Oct. 5, 1920.
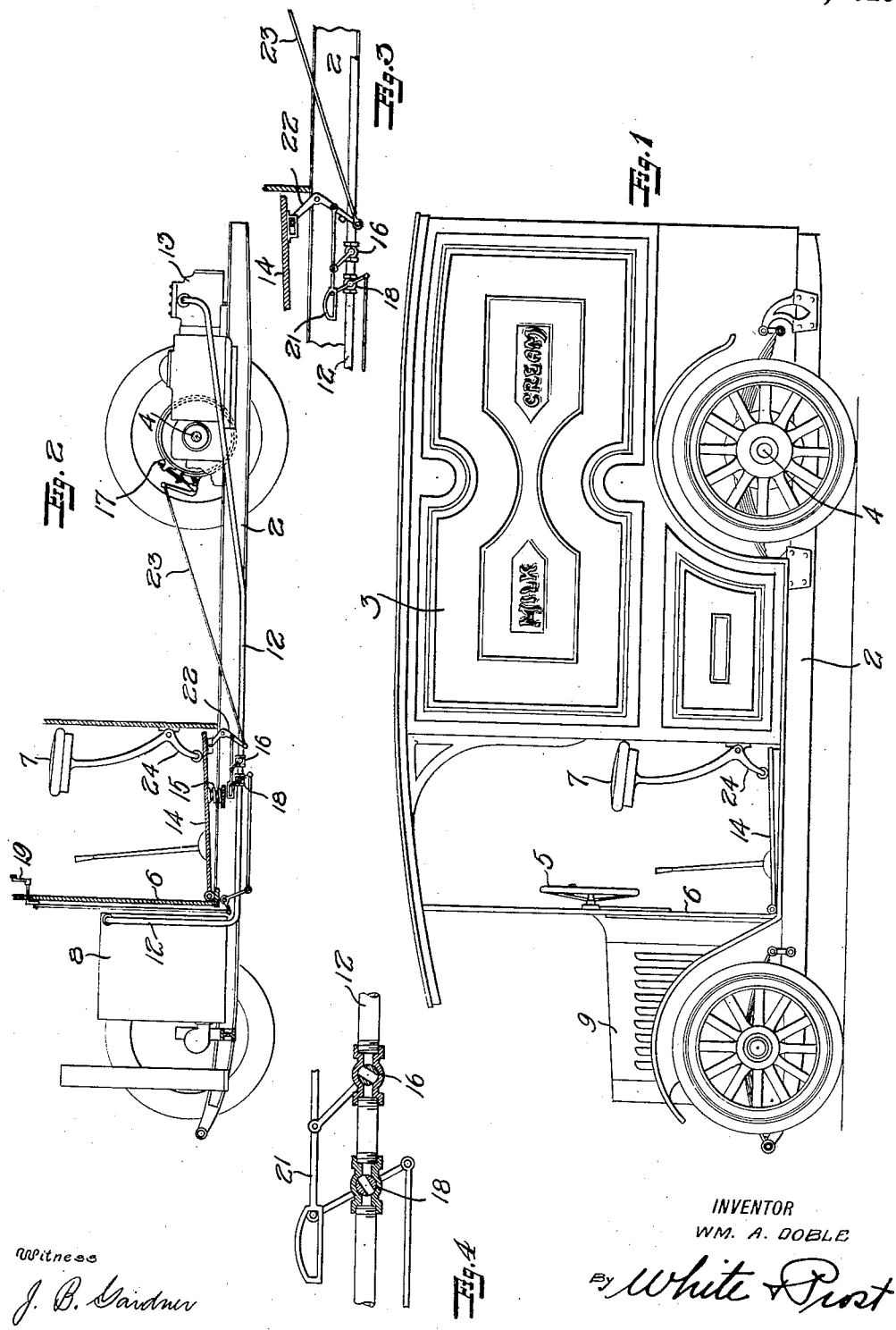
INVENTOR
WM. A. DOBLE
By White & Prost
ATTORNEYS
Witness
J. B. Gardner

UNITED STATES PATENT OFFICE.

WILLIAM A. DOBLE, OF SAN FRANCISCO, CALIFORNIA, ASSIGNOR TO DOBLE LABORATORIES, OF SAN FRANCISCO, CALIFORNIA, A CORPORATION OF CALIFORNIA.

POWER-PROPELLED VEHICLE.

1,354,898.     Specification of Letters Patent.     Patented Oct. 5, 1920.

Application filed October 1, 1917. Serial No. 194,214.

*To all whom it may concern:*

Be it known that I, WILLIAM A. DOBLE, a citizen of the United States, and a resident of the city and county of San Francisco, State of California, have invented a certain new and useful Power-Propelled Vehicle, of which the following is a specification.

The invention relates to a power propelled vehicle and particularly to a commercial vehicle, for use in the delivery of merchandise or other articles. The vehicle is particularly applicable to delivery service, in which many and frequent stops are made for the purpose of delivering material to individual customers, such as milk, bread or grocery delivery or department store, parcel post or similar delivery service.

An object of the invention is to lessen the cost of and the time required for delivery.

Another object of the invention is to provide a vehicle which requires a minimum effort on the part of the driver in getting into and out of the vehicle and in starting and stopping the vehicle.

All such deliveries of this nature were formerly made by horse-drawn vehicles, which in many ways possess an adaptability for this service, not possessed by the gasolene-propelled vehicles now employed in such service. For example, compare the delivery of milk by the horse-drawn vehicle and the gasolene propelled vehicle. The horses quickly learned the daily route and the location of the customers, so that they slowed up and stopped, without any influence of the driver, at the customer's house. As the wagon approached the house, the horses slowed up and the driver swung off the wagon while it was still in motion, so that by the time the horses stopped, he found himself at the rear of the wagon, permitting him to take the bottles of milk from the wagon and carry them to the house. As he again approached the wagon, the horses started and the driver swung himself on and by the time he was settled in his seat, the wagon was well on its way to the next customer. This reduced the time necessary for making each particular delivery to a minimum.

Contrast the above operation with the gasolene-propelled vehicle. As the driver approaches the house, he disengages his clutch, shifts his gears to neutral, uses his foot brake to bring the car to a stop and then applies the hand brake. He then works his way out from behind the steering wheel, climbs down from the vehicle, gets the milk and carries it into the house, all the while leaving the engine running. After delivering the milk he climbs into the car and settles himself in his seat, releases the hand brake, depresses the clutch pedal, shifts the gears to low, starts the car and their shifts through intermediate to the high gear. These operations require a much greater amount of time and energy to accomplish a delivery than is required with a horse-drawn vehicle and it is one of the objects of this invention to greatly reduce the amount of time and energy consumed. The seat in the ordinary commercial gasolene-driven delivery wagon is at a considerable distance above the ground and much energy is expended by the driver in climbing into and out of the seat and it is a further object of my invention to obviate this expenditure of energy.

The invention possesses other advantageous features, some of which, with the foregoing, will be set forth at length in the following description where I shall outline in full that form of the invention which I have selected for illustration in the drawings accompanying and forming part of the present specification. In said drawings I have shown one specific form of my generic invention, but it is to be understood that the invention as expressed in the claims may be embodied in a plurality of forms.

Referring to said drawings:

Figure 1 is a side view of the vehicle of my invention.

Fig. 2 is a vertical section of the chassis of the vehicle of my invention.

Fig. 3 is a view on a larger scale of a portion of the operating mechanism.

Fig. 4 is a detail, partly in section, of a portion of the operative mechanism.

In the drawings I have shown one type of delivery vehicle to which my invention is particularly applicable. The frame 2 of the vehicle lies close to the ground, so that the floor of the vehicle lies one step above the ground, thereby enabling the driver to enter or leave the vehicle with the least expenditure of energy. The floor of the vehicle is preferably flat and the body 3 opens at the front behind the driver's position, so that the driver may readily walk into the body. The interior of the body may be provided with shelves, racks or bins, depending upon the character of the goods to be delivered. That part of the body which overlies and overhangs the rear axle 4, is raised sufficiently to accommodate those parts. The body is provided with an opening on one side at the front at the driver's station, so that the driver merely steps from the vehicle to the ground and the side toward the opening is clear so that there are no obstructions offered to the ingress or egress of the driver.

The steering wheel 5 is preferably disposed in a vertical plane immediately behind the dash 6 so that it does not obstruct the driver's compartment and is so placed that it may be operated by the driver while standing. Where the character of the route is such as to require frequent stops, it is advisable for the driver to remain standing while operating the vehicle, but when desired, a folding seat 7 may be provided.

The vehicle is preferably of the steam-driven type, the steam being derived from the boiler 8, arranged under the hood 9, and being conveyed through the pipe 12 to the engine 13 which may be conveniently mounted on the rear axle or any other desirable location. The boiler is provided with a suitable liquid fuel burner, and means are provided for igniting the fuel and for controlling the operation of the burner in accordance with boiler conditions. These means may be similar to those shown in United States Patent No. 1,131,683 issued to J. A. Doble on March 16, 1915.

Means are provided for shutting off the flow of steam to the engine and for braking the vehicle with very little effort on the part of the driver. Arranged in the floor of the driver's compartment and preferably immediately behind the steering wheel, is a lever or platform 14, hinged at one end and pressed upwardly by one or more springs 15. This movable element or platform is arranged to be stood upon and depressed by the driver, and to rise when the driver stands off of it. Arranged in the steam pipe 12 is a valve 16, which is suitably connected to the movable element 14, so that when the element is depressed, the valve is opened and when the element is raised, the valve is closed. The vehicle is provided with a service brake 17 which is suitably connected to the platform, in such manner that when the platform is depressed the brake is released and when the platform is raised, the springs 15 operate to apply the brake.

The steam line is provided with a running valve 18 which is operated by the hand throttle 19 and the valves 16 and 18 are preferably connected together, so that a closing movement of the valve 16 partially but not entirely closes the valve 18, as shown in Fig. 4, and so that an opening movement of the valve 16 produces no movement of the valve 18. The movement of the valve 16 to its closed position moves the valve 18 to engine-starting position, but valve 18 may be entirely closed by the hand throttle when desired. The valves are connected by the slotted link 21, which is connected to the lever 22, pivoted on the frame and connected to the platform. The brake 17 is connected to the lever 22 by the rod 23. When the folding seat 7 is provided, it is provided with an extension 24 which engages the platform, so that when the driver occupies the seat, the platform is held depressed. A suitable emergency brake is provided for braking the vehicle when necessary.

In operation, the driver steps into the vehicle and onto the platform, thereby releasing the brake and opening the valve 16. The valve 18 is ordinarily open to the starting position, so that steam immediately flows to the engine, starting the vehicle. The driver then operates the hand throttle to produce the desired vehicle speed. As the place of delivery is approached, the driver steps off the platform, thereby shutting valve 16 and applying the brakes. As the vehicle slows down the driver reaches into the body for the desired package and steps from the vehicle, which has automatically come to a stop.

I claim:

1. In a power-propelled vehicle, a steam engine for propelling the vehicle, a pipe through which steam is conveyed to the engine, a valve in said pipe, a manually-operated lever for controlling the position of said valve, a second valve in said pipe, means for closing said second valve, and means operative by the closing of said second valve to impart a closing movement to said first valve.

2. In a power-propelled vehicle, a steam engine for propelling the vehicle, a pipe through which steam is conveyed to the engine, a valve in said pipe, a manually-operated lever for controlling the position of said valve, a second valve in said pipe, means connecting said valves whereby a closing movement of the second valve is accompanied by a closing movement of the first valve, and an upwardly spring-pressed element in the vehicle adapted to be stood on by the driver connected to said second valve, whereby an upward movement of said element causes a closing movement of the second valve.

3. In a power propelled vehicle, a steam engine for propelling the vehicle, a pipe through which steam is conveyed to the engine, a valve in said pipe, a manually operated lever for controlling the position of said valve, a second valve in said pipe, a spring pressed element adapted to be depressed by the driver of the vehicle connected to said second valve and means operably connecting said valves together.

4. In a power propelled vehicle, a steam engine for propelling the vehicle, a pipe through which steam is conveyed to the engine, a valve in said pipe, a manually operated lever for controlling the position of said valve, a second valve in said pipe, a spring pressed element adapted to be depressed by the driver of the vehicle connected to said second valve and means operative by the closing of the second valve to partially close the first valve.

5. In a power propelled vehicle, a steam engine for propelling the vehicle, a pipe through which steam is conveyed to the engine, a valve in said pipe, a manually operated lever for controlling the position of said valve, a second valve in said pipe, a spring pressed element adapted to be depressed by the driver of the vehicle connected to said second valve and means operative by the elevation of said element for closing the second valve and partially closing the first valve and operative by a depression of said element for opening the second valve only.

6. In a power propelled vehicle, a steam engine for propelling the vehicle, a pipe through which steam is conveyed to the engine, a valve in said pipe, a manually operated lever for controlling the position of said valve, a second valve in said pipe, a spring pressed element adapted to be depressed by the driver of the vehicle connected to said second valve and a link pivotally engaging the second valve and slidably engaging the first valve whereby said valves may be simultaneously closed and separately opened.

In testimony whereof, I have hereunto set my hand at San Francisco, California, this 22nd day of September, 1917.

WILLIAM A. DOBLE.

In presence of—
   H. G. PROST.